March 13, 1962   M. F. BEDIL ETAL   3,025,482
ELECTRIC POWER TRANSFORMERS
Filed June 3, 1959   2 Sheets-Sheet 1

Inventors:
MUSTAFA FAHRETTIN BEDIL
HARRY HAWLEY BEGENT
By: Stevens, Davis, Miller & Mosher
Attorneys March 13, 1962 M. F. BEDIL ETAL 3,025,482
ELECTRIC POWER TRANSFORMERS
Filed June 3, 1959 2 Sheets-Sheet 2

Inventors:
MUSTAFA FAHRETTIN BEDIL
HARRY HAWLEY BEGENT
By: Stevens, Davis, Miller+Mosher
Attorneys United States Patent Office 3,025,482
Patented Mar. 13, 1962

3,025,482
ELECTRIC POWER TRANSFORMERS
Mustafa Fahrettin Bedil and Harry Hawley Begent, Stafford, England, assignors to The English Electric Company Limited, London, England, a British company
Filed June 3, 1959, Ser. No. 817,766
Claims priority, application Great Britain June 11, 1958
5 Claims. (Cl. 336—5)

This invention relates to electric power transformers for multi-phase circuits and has for an object to facilitate handling and transport.

According to the invention a multi-phase electric power transformer is constructed with each phase in a separate tank magnetically unitable to form a single magnetic and tank structure, a seal being provided to prevent contamination of the contents of each phase tank portion during transport and assembly. The transformer is thus constructed as though it were a conventional multi-phase transformer in a single tank which had been cut into a number of pieces, each piece corresponding to a single phase. Suitable means, for example bolted flanges, are provided between each phase section of the tank and when these are secured in position relative to each other the arrangement is such that the parts of the core of the transformer are brought into close proximity. The fact that small gaps are included in the iron circuit of the transformer means inevitably that the magnetizing current is greater than in a corresponding transformer without the gaps. However, these gaps need only be quite small. For example in the case of very large transformers a gap of between a quarter and one eighth of an inch is quite feasible and the resulting increase in magnetizing current is frequently acceptable in view of the other gains.

Each flange of the transformer tank provided for securing the phase sections together is provided with a sealing diaphragm extending over or around the end face of the laminated magnetic structure of the phase section and closing off the associated tank from the surrounding atmosphere. A transformer constructed in this way may thus be prepared for use in the works where it is constructed in the usual manner, the insulating liquid, if any, drained out from each section and each section transported individually to the site where the transformer is to be used where they are re-erected by bolting together the adjoining flanges. During transit these flanges would be fitted with suitable protective covers to prevent the diaphragms from becoming damaged.

Figure 1:
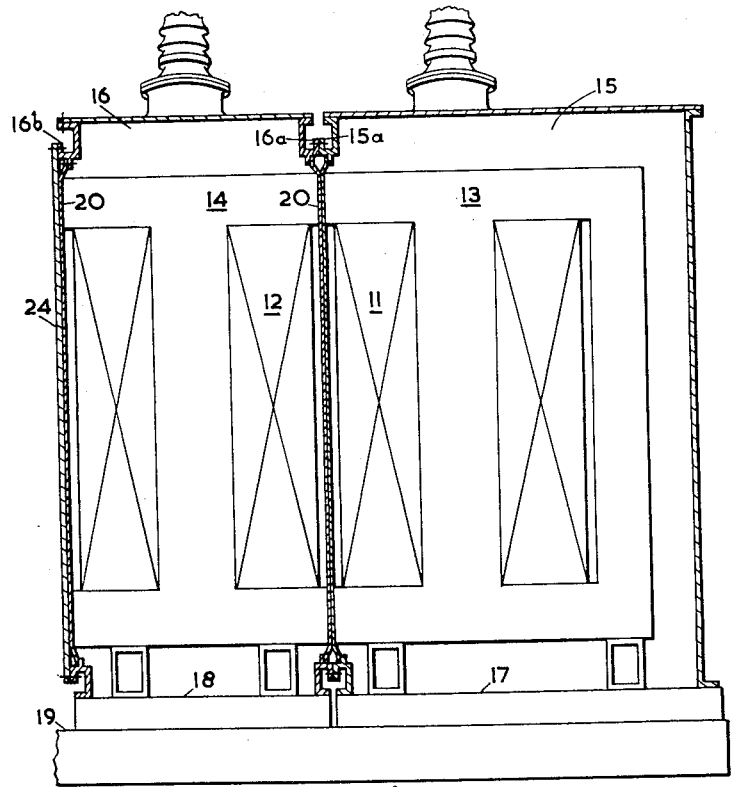
Figure 2:
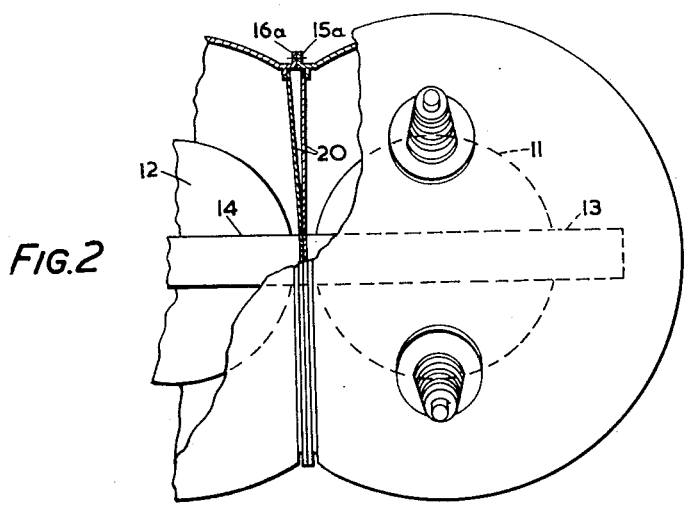
Figure 3:
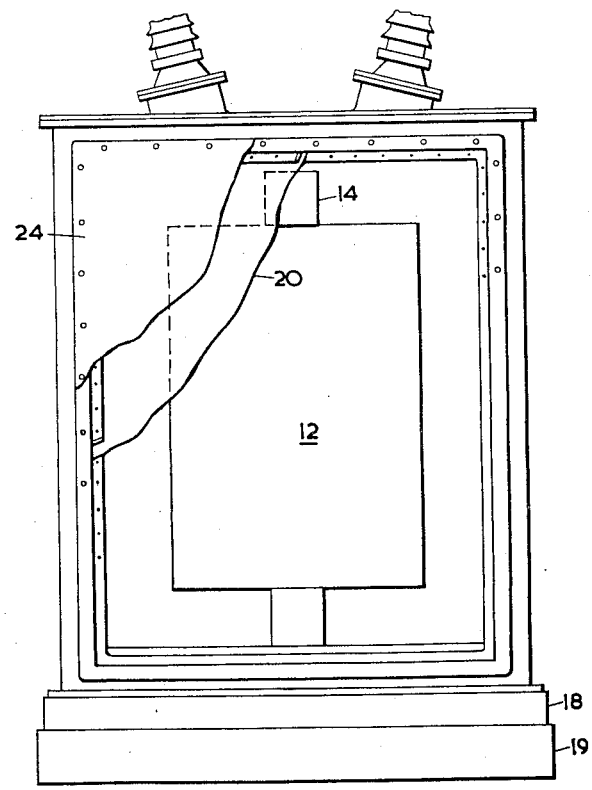
Figure 4:
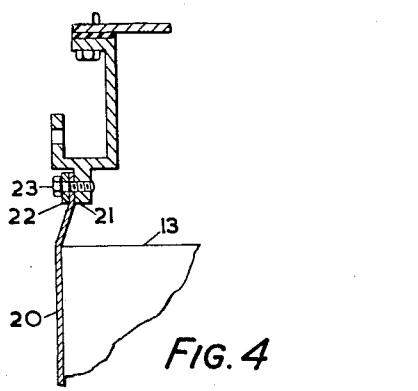

In order that the invention may be readily understood one form thereof will now be described with reference to the accompanying drawings in which FIG. 1 is an elevation of the tanks of two phases of a three-phase transformer occupying the relative positions they would occupy in service, FIG. 2 is a plan view of the transformer shown in FIG. 1, FIG. 3 is a side view of one of the phases shown in FIG. 1, and FIG. 4 is a sectional view on a larger scale showing one of the flanges for securing together the phase tanks.

Referring to the drawings, a three-phase transformer comprises three sets of primary and secondary windings two of which are shown at 11 and 12 respectively, wound on a five limbed core arranged in three parts, two of which are shown at 13 and 14 respectively. Each of the core parts is arranged inside an individual tank 15, 16 and the individual tanks are provided with flanges 15a, 16a, 16b etc. by which they may be joined together in an operative combination. Each phase tank is mounted on an individual sub frame shown at 17 and 18 and the sub frames are mounted on site on a main frame 19.

The tanks 15 and 16 shown in FIG. 1 are in the positions they would occupy when bolted together on site with the portions 13 and 14 of the core in juxtaposition. The contents of each tank are protected from contamination during handling and assembly by a diaphragm 20 of insulating material secured to a supplementary flange 21 by means of a clamping strip 22 and bolts 23; this is shown more clearly in the enlarged view of FIG. 4.

During transit the diaphragms 20 are protected from damage by steel transit covers 24 one of which is shown in position on the left hand side of FIG. 1. Since it is unlikely that the material used for the diaphragms 20 will be sufficiently strong to support the head of insulating liquid used in a liquid filled transformer, such liquid will be drained from the transformer before shipment and the transformer will be refilled after erection on site. All the preliminary operations may however be carried out in the factory so that when the transformer has been assembled on site the only further operation necessary is to refill it with liquid. In the case of transformers, however, which employ a gaseous filling medium, filling may take place in the factory and the transformers shipped complete with the filling medium.

It will usually be desirable to provide mechanical support for the ends of the core portions of each phase and for this purpose suitable packing material may be interposed between the core portions and the flanges by which the phase tanks are secured together. This packing material must not of course form a short-circuited turn around any one limb of the transformer, and to avoid this it may either be made of insulating material or if made of conducting material it may have a break filled with insulating material.

What we claim as our invention and desire to secure by Letters Patent is:

1. A multi-phase electric power transformer comprising a core formed in a plurality of parts, one for each phase, each part including a limb and yoke portions, the yoke portions of adjacent core parts being arranged to have their ends in close proximity so that the core forms a single magnetic structure, and the limbs being parallel to and laterally spaced from one another; a set of primary and secondary windings wound on each limb; tank means associated with each core part partially to surround said part; and means for structurally uniting adjacent tank means, thereby to form a single complete tank structure.

2. A multi-phase electric power transformer as claimed in claim 1 wherein said means for structurally uniting adjacent tank means comprises a bolting flange on said tank means associated with each core part, the bolting flanges on adjacent tank means being dimensioned to cooperate.

3. A multi-phase electric power transformer as claimed in claim 2 comprising also a sealing diaphragm extending over the bolting flange on said tank means, thereby to close off the interior of said tank means.

4. A multi-phase electric power transformer as claimed in claim 3 further comprising a rigid protective cover secured to the bolting flange, to prevent mechanical damage to the diaphragm during transit.

5. A multi-phase electric power transformer as claimed in claim 1 comprising also spacing and supporting means interposed between each said tank means and the corresponding core part, thereby to support said core part.

References Cited in the file of this patent
UNITED STATES PATENTS
2,415,688     Hall ------------------ Feb. 11, 1947